US012654134B2

(12) United States Patent
Wei et al.

(10) Patent No.: US 12,654,134 B2
(45) Date of Patent: Jun. 16, 2026

(54) SYSTEMS AND METHODS FOR COMPACT, DECENTRALIZED DESALINATION OF FEEDWATER FOR POINT-OF-USE APPLICATIONS

(71) Applicant: Massachusetts Institute of Technology, Cambridge, MA (US)

(72) Inventors: Quantum J. Wei, Cambridge, MA (US); Sahil Rajesh Shah, Edmonton (CA); Grace Bethea Connors, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 269 days.

(21) Appl. No.: 18/033,898

(22) PCT Filed: Nov. 30, 2021

(86) PCT No.: PCT/US2021/061107
§ 371 (c)(1),
(2) Date: Apr. 26, 2023

(87) PCT Pub. No.: WO2022/159175
PCT Pub. Date: Jul. 28, 2022

(65) Prior Publication Data
US 2023/0405525 A1      Dec. 21, 2023

Related U.S. Application Data

(60) Provisional application No. 63/199,772, filed on Jan. 24, 2021.

(51) Int. Cl.
*B01D 61/12* (2006.01)
*B01D 61/02* (2006.01)
(Continued)

(52) U.S. Cl.
CPC .......... *B01D 61/026* (2022.08); *B01D 61/12* (2013.01); *C02F 1/008* (2013.01); *C02F 1/441* (2013.01);
(Continued)

(58) Field of Classification Search
CPC ................. B01D 61/026; B01D 61/12; B01D 2313/243; B01D 2313/701;
(Continued)

(56) References Cited

U.S. PATENT DOCUMENTS

| | | | | | |
|---|---|---|---|---|---|
| 4,341,629 A | * | 7/1982 | Uhlinger | .............. | B01D 61/026 |
| | | | | | 210/138 |
| 6,103,125 A | * | 8/2000 | Kuepper | ................ | B01D 61/12 |
| | | | | | 210/257.2 |

(Continued)

FOREIGN PATENT DOCUMENTS

| | | | | | |
|---|---|---|---|---|---|
| CN | 207132324 U | * | 3/2018 | .............. | F22D 11/06 |
| JP | 6111854 B2 | * | 4/2017 | .......... | Y02A 20/131 |

(Continued)

OTHER PUBLICATIONS

English translation of JP_6111854_B2, Apr. 12, 2017. (Year: 2017).*

(Continued)

*Primary Examiner* — Joseph W Drodge
(74) *Attorney, Agent, or Firm* — Barnes & Thornburg LLP

(57) ABSTRACT

Systems and methods for configuring compact desalination RO systems operable for point-of-use applications are disclosed herein. The compact RO system can include a single RO element disposed in a vessel and connected to one or more pumps in a circulation loop that recirculates fluid through the vessel. The compact RO system can reconfigure, combine and/or eliminate one or more components to reduce a footprint of the system. For example, the RO system can (Continued)

L1 utilize pumps having flow valves integrated therein instead of separate pump and valve components. High recovery ratios can be maintained by allowing brine produced by the RO element to exit the system before passing through the pump. In some embodiments, the system can utilize pulse width modulation (PWM) to change a flow rate of the pump within the system to ensure operation at peak pressure and flow rate.

15 Claims, 5 Drawing Sheets

(51) Int. Cl.
C02F 1/00 (2023.01)
C02F 1/44 (2023.01)

(52) U.S. Cl.
CPC .. *B01D 2313/243* (2013.01); *B01D 2313/701* (2022.08); *B01D 2317/02* (2013.01); *B01D 2317/04* (2013.01); *C02F 2209/006* (2013.01); *C02F 2209/03* (2013.01); *C02F 2209/40* (2013.01); *C02F 2301/046* (2013.01); *C02F 2303/22* (2013.01)

(58) Field of Classification Search
CPC ............ B01D 2317/02; B01D 2317/04; B01D 2311/2523; B01D 61/02; B01D 61/025; B01D 61/10; B01D 2311/16; B01D 2311/165; B01D 2311/25; B01D 2311/251; B01D 2311/2512; B01D 2313/24; C02F 1/008; C02F 1/441; C02F 2209/006; C02F 2209/03; C02F 2209/40; C02F 2301/046; C02F 2303/22; C02F 2209/05; Y02A 20/131
See application file for complete search history.

(56) References Cited

U.S. PATENT DOCUMENTS

| | | | | |
|---|---|---|---|---|
| 10,166,510 | B2 | 1/2019 | Warsinger et al. | |
| 2005/0145570 | A1 | 7/2005 | Pipes | |
| 2007/0272393 | A1 | 11/2007 | Reichenbach et al. | |
| 2009/0138746 | A1 | 5/2009 | Klemer | |
| 2014/0231348 | A1* | 8/2014 | Sackstein | C02F 1/32 422/186.04 |
| 2015/0231571 | A1* | 8/2015 | Volker | B01D 61/025 210/636 |
| 2015/0352498 | A1* | 12/2015 | Raman | B01D 61/422 204/632 |
| 2017/0080389 | A1* | 3/2017 | Kelada | B01D 61/08 |
| 2017/0152154 | A1* | 6/2017 | Saveliev | B01D 61/10 |
| 2017/0216774 | A1 | 8/2017 | Warsinger et al. | |
| 2017/0239620 | A1* | 8/2017 | Warsinger | B01D 61/10 |
| 2017/0320016 | A1* | 11/2017 | Wei | B01D 61/025 |
| 2017/0349467 | A1* | 12/2017 | Blohm | B01D 61/428 |
| 2018/0318767 | A1 | 11/2018 | Roitel et al. | |
| 2019/0092656 | A1 | 3/2019 | Oklejas, Jr. | |
| 2019/0160431 | A1 | 5/2019 | Warsinger et al. | |
| 2020/0261849 | A1 | 8/2020 | Wei et al. | |
| 2020/0261850 | A1* | 8/2020 | McGovern | C12H 3/04 |
| 2023/0405525 | A1 | 12/2023 | Wei et al. | |

FOREIGN PATENT DOCUMENTS

| | | | | | |
|---|---|---|---|---|---|
| WO | WO-2019226934 | A1 * | 11/2019 | .......... | B01D 61/026 |
| WO | WO-2020046569 | A1 * | 3/2020 | ............. | C02F 1/441 |
| WO | 2022159175 | A1 | 7/2022 | | |

OTHER PUBLICATIONS

English translation of CN_207132324_U, Mar. 23, 2018. (Year: 2018).*
International Search Report and Written Opinion for Application No. PCT/US2021/061107 dated Apr. 11, 2022 (15 pages).

* cited by examiner

SYSTEMS AND METHODS FOR COMPACT, DECENTRALIZED DESALINATION OF FEEDWATER FOR POINT-OF-USE APPLICATIONS

CROSS REFERENCE TO RELATED APPLICATIONS APPLICATION

This application is a U.S. national counterpart application of International Application Serial No. PCT/US2021/061107, entitled "Systems and Methods for Compact, Decentralized Desalination of Feedwater for Point-of-Use Applications," filed Nov. 30, 2021, which claims priority to and the benefit of U.S. Provisional Application No. 63/199,772, entitled "Semi Batch Reverse Osmosis System and Improvements for Compact Desalination Applications," filed on Jan. 24, 2021, the disclosures of each of which is incorporated by reference herein in its entirety.

FIELD

The present disclosure relates to and methods for improved desalination of feedwater, and more particularly relates to improved configurations of desalination system components to allow for maintenance of high permeate recovery rates while maintaining a compact footprint of the overall system for suitability of operation in point-of-use applications.

BACKGROUND

Due to growing water scarcity around the globe, expansion and diversification of the world's water supplies can be beneficial to humanity as it can save lives, prevent disease, and allow nations to thrive where previously unable. A lot of the water on Earth is contained in its oceans, seas, and saline aquifers, which due to their high salt content, needs to be purified prior to consumption or certain productive use by humans. Reverse osmosis (RO) is a state-of-the-art technology for water desalination. RO involves passing water that to be demineralized or deionized under pressure through a semi-permeable membrane. RO counteracts the natural osmosis process, in which a solution having a lower concentration (e.g., pure water) tends to migrate to a solution with a higher concentration (e.g., salt water), by applying pressure to the higher concentration solution that is greater than the naturally occurring osmotic pressure to push the higher concentration solution across the semi-permeable membrane(s) separating the lower and higher concentration solutions and to a side of the membrane(s) where the lower concentration solution is located. The semi-permeable membrane allows the water to pass through to the lower concentration solution side but blocks a majority of the other substances (e.g., salt) from passing across it.

Existing RO systems have several shortcomings. For example, existing systems utilize a large number (e.g., five or more) of valves, RO elements, and vessels, which increase an overall surface area of the system, rendering the system unusable in a variety of settings. RO systems conventionally are able to achieve high recovery rates, with each additional RO element exhibiting diminishing returns on recovery performance while significantly increasing a size of the overall system. Moreover, orientations of pumps and valves within conventional RO systems can result in brine buildup from the RO elements to unnecessarily cycle through the system prior to ejection, which increases fouling and residue in the pumps and piping of the system that can lead to increased maintenance costs and downtime for repair and replacement of parts. Additionally, existing RO systems operate within a range of tolerances that do not exhibit peak pumping and flow rate efficiency. Rather, existing RO systems operate at a specific flow rate without accounting for such factors as fouling of the RO element and/or the vessel, salinity content of the feedwater, among others. Failing to measure, much less adjust these parameters, leads to overall system inefficiencies that significantly increase costs of operation and maintenance. In general, existing RO systems are costly due to high energy requirements and consumption.

Accordingly, improved systems and methods are needed for use in decentralized, point-of-use applications that are compact without sacrificing energy and/or performance of conventional RO systems.

SUMMARY

The present application is directed to systems and methods for configurations of desalination system components to allow the system to maintain high permeate recovery rates while also having a compact footprint for suitability of operation in point-of-use applications. Reverse osmosis systems use fluid flowing through circulation tubing, or piping, for example, in high pressure systems, in conjunction with pressurized vessels and membranes for permeate production that accumulate brine with repeated use. Reconfiguration and/or elimination of one or more components of these high pressure systems can greatly reduce an overall footprint of the system allowing for operability in point-of-use applications without sacrificing the recovery ratio of a conventional system. For example, in some embodiments, a circulation pump having a one-way valve integrated therein can be used in lieu of a separate pump and valve to recirculate fluid through the vessel of the system while minimizing an overall volume or footprint of the system. Additionally, in some embodiments, the circulation pump can be moved to a location in which brine has been ejected from the system prior to entering the pump, thereby decreasing fouling of the system and increasing a lifespan of the components.

Moreover, in time-varying RO processes, system salinity increases over the course of a permeate production phase. As salinity increases, pulse-width modulation can be used to control the voltage of the high pressure pump, which can signal to system components to adjust a flow rate of the fluid through the pumps of the system to account for the increase in salinity. For example, voltage can be controlled by varying flow rate and/or indirectly controlling pressure. Once the system calibrates to the new salinity levels, the flow rate can be increased to a threshold tolerance of the RO element to maximize desalination efficiency of the overall system. The RO element(s) can have both maximum flux or flow rates and pressure thresholds, which can be used to help maximum efficiency.

In one exemplary embodiment of a fluid desalination system, the system includes at least one reverse osmosis element, a conduit network, a first pump, a second pump, and a controller. The reverse osmosis element(s) includes an inlet and an outlet, while the conduit network includes a loop and a permeate branch. The loop is in fluid communication with the at least one reverse osmosis element to convey fluid passed through the at least one reverse osmosis element from the outlet to the inlet so the fluid enters the at least one reverse osmosis element again. The permeate branch is in fluid communication with the at least one reverse osmosis element to receive fluid that has been desalinated by the at least one reverse osmosis element. The first pump is disposed within the loop and is configured to move the fluid from the outlet and towards the inlet. The second pump is configured to introduce fluid into at least one of the loop and the at least one reverse osmosis element. The controller is configured to supply a pulse width modulation signal to the second pump to control at least one of a pressure, a flow speed, or a volumetric flow rate of the fluid introduced by the second pump into at least one of the loop and the at least one reverse osmosis element.

In some embodiments, the at least one reverse osmosis element can include no more than two reverse osmosis elements. When two reverse osmosis elements are included, in some instances the two reverse osmosis elements can be arranged in series, while in other instances the two reverse osmosis elements can be arranged in parallel.

The system can further include one or more feedback sensors. The feedback sensor(s) can be configured to measure, for example, at least one of pressure, voltage, permeate flow rate, concentration, or current of fluid entering or leaving the at least one reverse osmosis element. The sensor(s) can deliver the measurements as an output to the controller, and the controller can be configured, for example, to adjust the pulse width modulation signal based on the output of the sensor(s).

The conduit network can include a waste branch. The waste branch can have, for example, a valve configured to be toggled to allow fluid to drain from at least one of the loop and the at least one reverse osmosis element. In some embodiments, the controller can be configured to adjust the pulse width modulation signal based on an accumulation of salinity in the at least one reverse osmosis element.

The first pump can include a diaphragm pump having one or more check valves disposed in it. In some embodiments, the loop can be devoid of a one-way valve that is separately disposed from the first pump. In some embodiments, a flow rate of the fluid through the second pump can be approximately in the range of about 5 Liters per hour to about 40 Liters per hour.

In one exemplary embodiment of a method of operating a desalination system, the method includes flowing a fluid through a conduit network through at least one reverse osmosis element, with the conduit network having at least a loop and a permeate branch. The method further includes recirculating a fluid that exits the at least one reverse osmosis element through the loop and back into the at least one reverse osmosis element. The fluid flows through a pump that is disposed within the loop, and a flow rate through the pump is approximately in the range of about 50 Liters per hour to about 200 Liters per hour.

The method can further include sending a signal to the second pump to adjust one or more of a pressure, a flow speed, or a volumetric flow rate of the fluid output by the second pump. The signal can be, for example, a pulse width modulation signal. In some embodiments, the method can further include adjusting the signal based on an amount of an accumulation of salinity in the at least one reverse osmosis element. The method can further include measuring at least one of pressure, voltage, permeate flow rate, or current of the system, determining a concentration of fluid based on the measurement of the at least one of pressure, voltage or current of the system, and adjusting the signal based on the determined concentration of the fluid.

The action of flowing the fluid can further include operating a second pump to generate a pressure across the conduit network to flow the fluid into at least one of the loop and the at least one reverse osmosis element. The pump can include one or more check valves disposed in it. In some embodiments, the at least one reverse osmosis element can include no more than two membranes. In some embodiments, the loop can be devoid of a one-way valve that is separately disposed from the pump.

In another exemplary embodiment of a fluid desalination system, the system includes at least one reverse osmosis element, a conduit network, and a pump. The reverse osmosis element(s) includes an inlet and an outlet, and the conduit network includes a loop and a permeate branch. The loop is in fluid communication with the at least one reverse osmosis element to convey fluid passed through the at least one reverse osmosis element from the outlet to the inlet so the fluid enters the at least one reverse osmosis element again. The permeate branch is in fluid communication with the at least one reverse osmosis element to receive fluid that has been desalinated by the at least one reverse osmosis element. The pump is disposed within the loop and is configured to move the fluid from the outlet and towards the inlet. The pump has one or more one-way check valves disposed in it, and the loop is devoid of a one-way valve that is separately disposed from the pump.

The system can further include a second pump. The second pump can be configured to introduce fluid into at least one of the loop and the at least one reverse osmosis element. In some embodiments, the system can further include a control system. The control system can be configured to supply a pulse width modulation signal to the second pump to control at least one of a flow speed or a volumetric flow rate of the fluid introduced by the second pump into at least one of the loop and the at least one reverse osmosis element.

In some embodiments, the at least one reverse osmosis element can include no more than two membranes. When two reverse osmosis elements are included, in some instances the two reverse osmosis elements can be arranged in series, while in other instances the two reverse osmosis elements can be arranged in parallel. In some embodiments, the conduit network can include a waste branch. The waste branch can have a valve that can be configured to be toggled to allow fluid to drain from at least one of the loop and the at least one reverse osmosis element.

BRIEF DESCRIPTION OF THE DRAWINGS

This disclosure will be more fully understood from the following detailed description taken in conjunction with the accompanying drawings, in which.

DESCRIPTION

Figure 1:
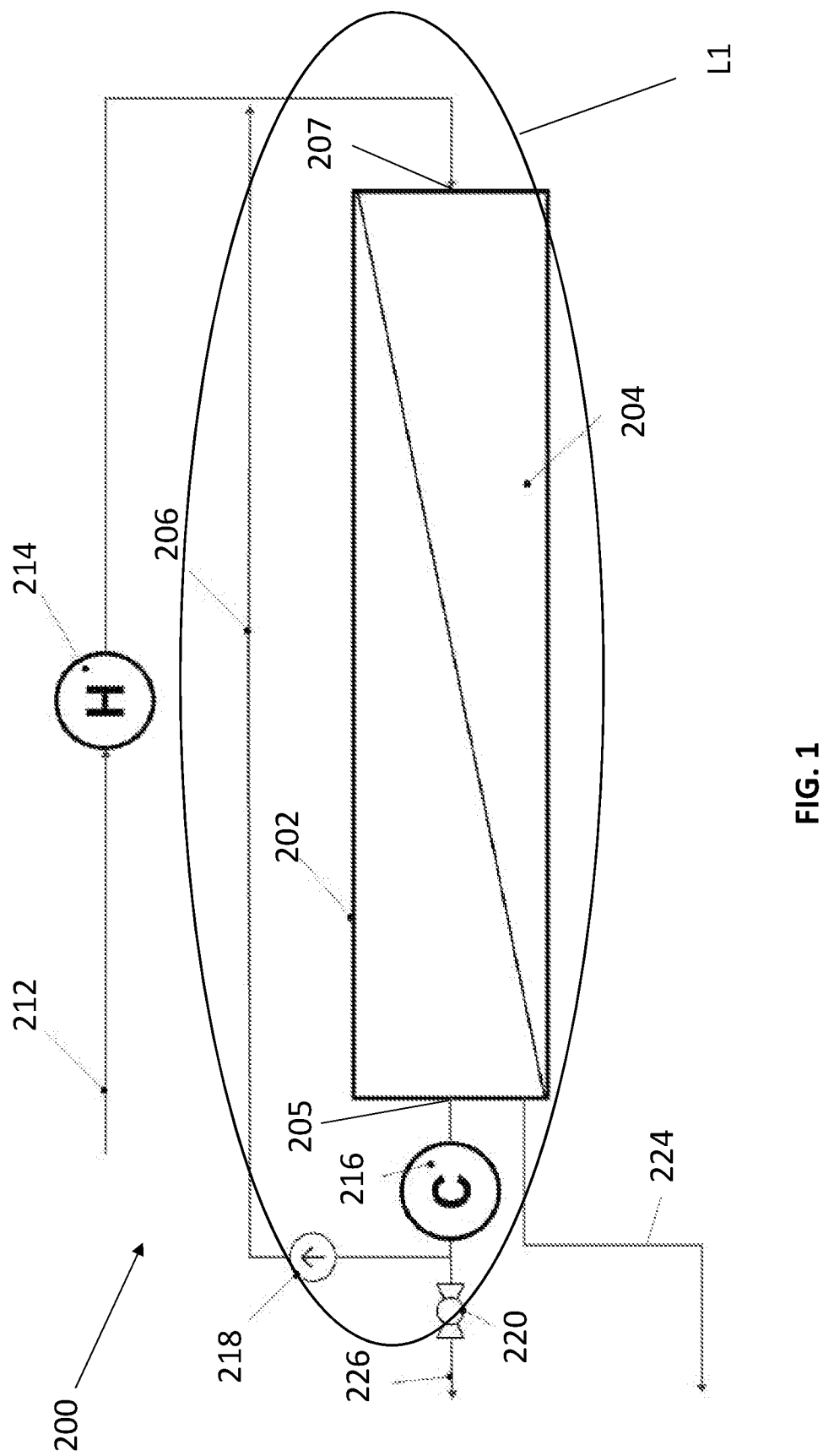
FIG. 1 is a schematic diagram of a semi-batch RO system having a circulation pump and a one-way valve for recirculating fluid through the vessel.

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, compositions, and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure.

To the extent that the present disclosure includes various terms for components and/or processes of the disclosed systems, methods, and the like, one skilled in the art, in view of the claims, present disclosure, and knowledge of the skilled person, will understand such terms are merely examples of such components and/or processes, and other components, designs, processes, and/or actions are possible. By way of non-limiting example, a person skilled in the art will recognize various terms that are used herein interchangeably, such as the terms "conduits" and "lines" to refer to the conduits within the system that can be responsible for connecting system components and flowing saline fluid and/or flushing fluid throughout the system. By way of further non-limiting example, the terms "RO element" and "RO membrane" can be used interchangeably to refer to the component of the system that is responsible for desalination of the fluid flowing through the system by reverse osmosis. Moreover, by way of further non-limiting example, the terms "one-way valve," "check valve," and "one-way check valve" are used interchangeably in the application to denote one or more valves that regulate a direction of flow of fluid through the system.

Further, to the extent features, sides, or steps are described as being "first" or "second," such numerical ordering is generally arbitrary, and thus such numbering can be interchangeable. Still further, in the present disclosure, like-numbered components of various embodiments generally have similar features when those components are of a similar nature and/or serve a similar purpose. Lastly, the present disclosure includes some illustrations and descriptions that include prototypes or bench models. A person skilled in the art will recognize how to rely upon the present disclosure to integrate the techniques, systems, devices, and methods provided for into a product in view of the present disclosures.

The present disclosure generally relates to compact desalination RO systems operable for point-of-use applications. The compact RO system can reconfigure, combine and/or eliminate one or more components to reduce a footprint of the system without significantly reducing recovery ratios afforded by the system. For example, the RO system of the present disclosure can use a single RO element in a single vessel where conventional systems utilize six to eight RO elements. Moreover, the RO system of the present disclosure can utilize pumps having flow valves that are integrated therein for compactness and simplicity of use, instead of separate pump and valve components of the prior art. To maintain high recovery ratios, the configuration of the pump within the circulation loop can be changed such that a substantial amount of brine produced by the RO element can exit the system prior to passing through the pump. Eliminating a substantial fraction of the brine from the system prevents fouling of the pump and conduits, thereby decreasing downtime and increasing overall efficiency of the system. In some embodiments, the system can monitor salinity of the system, such that as salinity increases, pulse width modulation (PWM) can be used to change a flow rate of the pump(s) within the system. For example, varying PWM can maximize the permeate production rate while ensuring that: (i) the permeate production rate does not exceed a specified maximum value; and (ii) the feed pressure does not exceed a specified maximum value. Both maximum values can be set by adjusting one or more parameters or limitations of the RO element, as provided for herein and/or as derivable from the present disclosures in view of a person skilled in the art. It will further be appreciated that reverse osmosis systems to which the methods of the present disclosure can be applied can include any time-variant RO process (e.g., semi-batch, pulse-flow) or static RO process (e.g., single-stage RO, two-stage RO).

FIG. 1 illustrates an exemplary embodiment of a semi-batch or closed-circuit RO system 200. The semi-batch system 200 can recirculate feed through an RO membrane and increase the feed pressure to produce permeate as the recirculated feed grows more saline. As shown, the semi-batch RO system 200 can include a reverse osmosis (RO) element 202 and a vessel 204 for housing the RO element 202. The RO element 202 can be contained within the vessel 204, with the vessel being capable of withstanding a range of hydraulic pressures that are encountered by the RO element 202 during the desalination operation. While the system 200 is shown having singular components, such as a single RO element 202, it will be appreciated by a person skilled in the art that at least some components of the system 200 can include two or more components, such as two or more RO elements. In embodiments in which a plurality of RO elements 202 are included in the system 100, the RO elements can be arranged in series, parallel, or a combination of series and parallel. Moreover, each vessel 204 can contain a single RO element 202 therein, as shown, though in some embodiments, a plurality of RO elements can be contained in each vessel 204.

The system 200 can include a network of recirculation conduits or recirculation lines 206. As shown, the conduit network 206 can include a loop L1 and a permeate branch. The loop L1 of the conduit network 206 can be in fluid communication with the RO element 202 to convey fluid from an outlet 205 of the vessel 204 and/or the RO element 202 to an inlet 207 of the vessel 204 and/or the RO element 202. The loop L1 can include a valve 218 that prevents fluid to travel in a direction opposite of the arrow, e.g., fluid is prevented from traveling counterclockwise between the recirculation conduit 206 and the vessel 204. That is, fluid is prevented from flowing from the inlet 207 through the valve 218 to the outlet 205 via the conduit network 206. The permeate branch 224 can connect to the vessel 204 and/or the RO element 202 to convey permeate away from the RO element 202.

The system 200 can further include a high pressure pump 214 and a circulation pump 216. The high pressure pump 214 can generate, at a minimum, a pressure that exceeds the osmotic pressure of the brine at the end of the desalination cycle. The circulation pump 216 can recirculate fluid in a loop L1 through the vessel 204.

The system 200 can include one or more solenoid valves that are in fluid communication with the RO element 202 and/or the circulation pump 216. As shown, the system 200 can include a solenoid valve 220 that connects to the circulation pump 216. The solenoid valve 220 can, when opened, enable fluid to be drained from the loop L1. When both circulation pump 216 and the solenoid valve 220 are open, the quantity that is recirculated versus the quantity that bleeds out the solenoid valve 220 can depend, at least in part, on the hydraulic resistance of the circulation loop versus the hydraulic resistance of the solenoid valve. An inlet conduit 212 can convey feedwater, e.g., salinated water, to the high-pressure pump 214 as shown. Brine can be conveyed away from the RO element 202 through a brine ejection line 226. It will be appreciated that additional conduits or lines can be used in the system in addition, or in lieu of, the conduits discussed above to bring and/or remove feed, water, and/or fluid to and from the system 200.

Figure 2A:
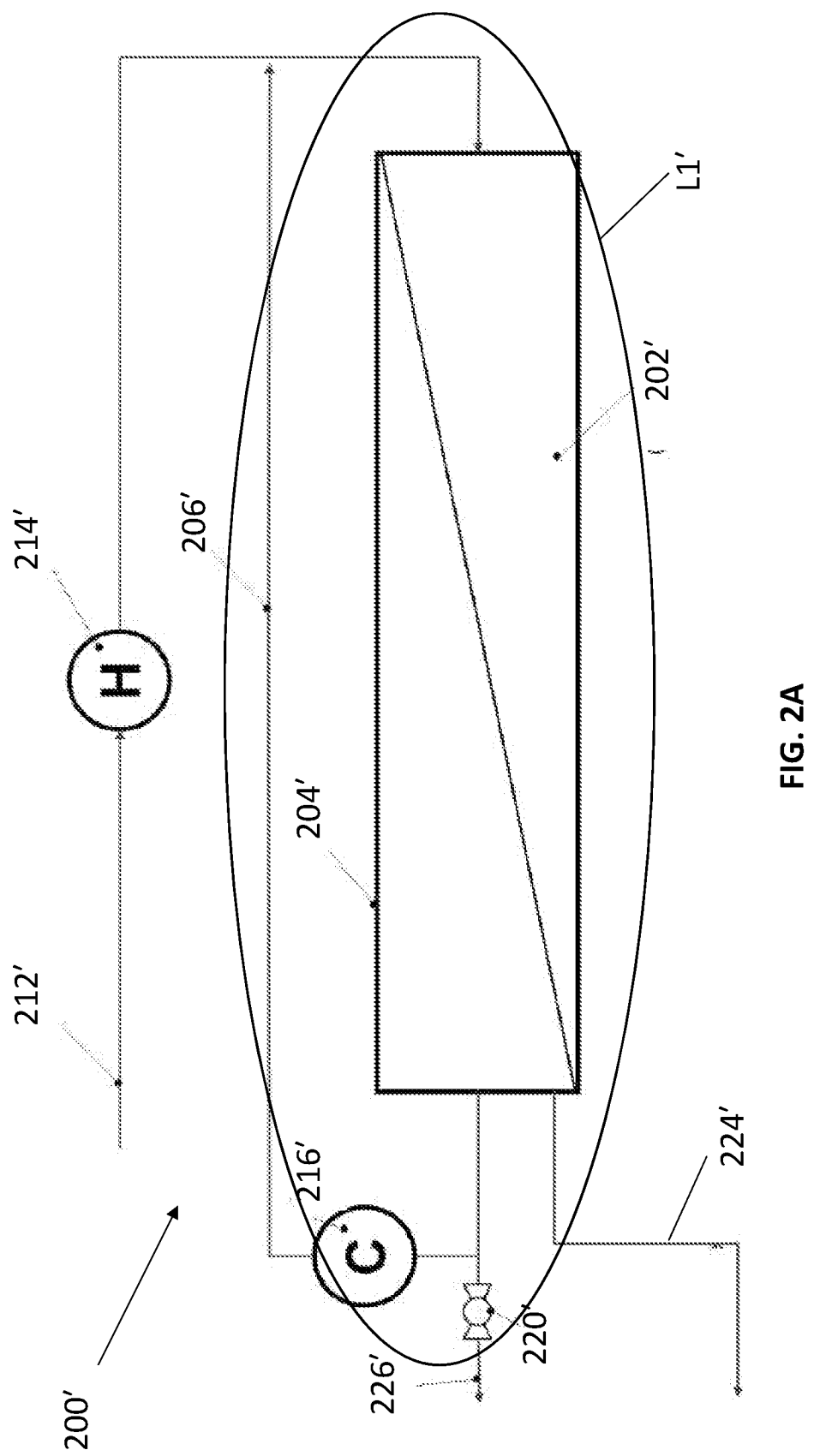
FIG. 2A is a schematic diagram of one exemplary embodiment of a modified, compact semi-batch RO system of the present disclosures.

An alternate embodiment of a semi-batch RO system 200' of the present disclosure is shown in FIG. 2A. As shown, the system 200' is more compact to allow point-of-use reverse osmosis desalination to be made more energy and water-efficient. The components of the system 200' are substantially the same as that of the system 200 described above. Except as indicated below, or as will be readily appreciated by one having ordinary skill in the art having read the present disclosure, the structure and operation of the system 200' is substantially the same as that of the system features described above and therefore a detailed description is omitted here for the sake of brevity.

A person skilled in the art will recognize that the presently disclosed semi-batch RO system 200' differs from conventional RO systems in that conventional RO systems, e.g., single-pass continuous systems, utilize a larger number of elements within the system to produce comparable fresh-water recovery rates. For example, the system 200' has been shown to produce recoveries up to, and including, approximately 75%. Even higher recovery rates may be possible relying upon the present disclosures. A person skilled in the art will recognize that point-of-use system that desalinate brackish groundwater typically achieve recovery rates approximately in the range of about 25% to about 30% with only one element, while the per-element recovery that is typically recommended for well water by the manufacturer is about 19%. Accordingly, the 75% recovery capabilities of the instant system are a marked improvement over existing systems. The fact that these recovery levels are achieved in the instance system without having a separate reservoir is also significant when compared to other systems that may be able to achieve significant recovery rates but utilize a separate reservoir.

It will be appreciated that each RO element 202' of the present embodiments can include an inlet and an outlet for receiving the fluid therethrough. For example, as shown, fluid that exits the circulation pump 216' can travel through the recirculation conduit 206' to enter the inlet of the RO element 202' for desalination and exits through the outlet of the RO element 202' to reenter the circulation pump 216' to be pumped through the conduit 206'. Moreover, in addition to each RO element having an individual inlet and outlet, in embodiments in which two or more RO elements are included in the system 200' to form an RO element network in which each RO element is in fluid communication with one another as well as the recirculation conduit 206' and the remainder of the system components, an inlet of the first RO element can serve as an inlet for the fluid while an outlet of an end RO element of the RO element network can serve as an outlet for desalination of the fluid within the system 200'.

As shown, the system 200' can include a circulation pump 216' in fluid communication with the recirculation conduit 206' for receiving fluid that exits the RO element 202'. The circulation pump 216' can include a diaphragm pump, piston pump, gear pump, vane pump, positive displacement pump, and/or centrifugal pump. The circulation pump 216' can be disposed in place of a one-way valve 218 of the system 200, with no one-way valve being separately included in the system 200'. Instead, in some embodiments, the circulation pump 216' can include one or more internal one-way check valves (not shown) to prevent fluid from traveling in a direction opposite of the arrow, e.g., counterclockwise to prevent the fluid from traveling between the recirculation conduit 206' and the vessel 204'. In such configurations, fluid that exits the vessel 204' can flow through a junction that splits between a first conduit towards the circulation pump 216' and a second conduit towards the solenoid valve 220'. In use, fluid can circulate through the circulation pump 216' on a substantially constant production phase duration until a predetermined condition (e.g., predetermine time, predetermined concentration in the brine, predetermined pressured, certain limitations of the pump) is met to switch flow towards the solenoid valve 220', such as during the flush phase, as described in greater detail below. Production phase duration is not a robust method of controlling the recovery, however. For example, if the feedwater changes or the RO element 202' wears out, the fixed-duration method of controlling the process will not guarantee the same water recovery.

Once the solenoid valve 220' is open, brine can exit the system 200' based, for example, on criteria similar to the batch RO system 200. In this embodiment, at least some quantity of fluid will be flushed out while at least some of it will be recirculated through the recirculation conduit 206'. That is, the circulation pump 216' can recirculate fluid in a loop L1' of the conduit network through the vessel 204', while brine can be conveyed away from the RO element 202' through a brine ejection line 226'. The split of the fluid at the junction can depend, at least in part, on how much suction the circulation pump generates, as well as resistance of the solenoid valve 220' and/or the resistance of the circulation pump 216'. It will be appreciated that the circulation pump 216' can be disposed anywhere along the recirculation conduit 206' to pump the fluid back to the RO element 202' with the understanding that longer pipes negatively impact compactness of the system and increase volume of the recirculation conduit 206'. It will be appreciated that use of longer piping may impact performance, for example, by increasing a length of the batch cycle and leading to greater flush volumes.

Placement of the circulation pump 216' and the solenoid valve 220' in the relative locations shown in FIG. 2A allow for flushing improvement of the system 200'. The absence of the one-way valve 218 can be attributed, for example, to use of a diaphragm pump having an integrated one-way valve located on the outlet of the circulation pump 218'. The diaphragm pump can therefore prevent backflow of fluid, while also making the system more compact and/or having fewer separate parts. Having fewer separate parts can allow for increased performance, lowered risk of failure, and can make it easier to identify failures, among other improvements over existing systems, as discussed above.

Semi-batch RO systems have the benefit of decoupling the feed flow rate from the recovery ratio. Throughout each batch, feed recirculates around the system multiple times until the desired recovery ratio is achieved. The system can be tuned to achieve any recovery ratio desired, as compared to conventional RO systems with a single membrane, which are limited to low recoveries to stay above the minimum concentrate flow (in concert with the restriction on local flux). Use of the present system 200' can be an attractive process for application in which high recovery is sought in a compact footprint, such as in household water purifiers, commercial purifiers for use in restaurants, cafes, offices, or remote locations, e.g., oil rigs. Moreover, the system 200' being devoid of the one-way valve 218 can further reduce the footprint of the system 200' to better allow the batch RO to be implemented on benches, in desktop applications, and for point-of-use fluid desalination applications, such as in developing countries and/or in locations that do not have access to drinkable freshwater.

The semi-batch RO system 200' can operate cyclically through at least two phases: production and flushing. During the production phase, the solenoid valve 220' can be shut. The high-pressure pump 214' introduces feed into the system 200' while the circulation pump 216' recirculates the brine through the RO element 202'. The inflow from the high-pressure pump 214' can cause the system pressure to rise above the osmotic pressure of the brine, which in turn can cause water to permeate through the RO membrane 202' and the brine to become more concentrated. Once the system is pressurized, the rate of feed inflow can equal the permeate outflow. Permeate product can continue until the brine becomes sufficiently concentrated. Then, the flush phase can be triggered by opening the solenoid valve 220', as discussed above. Opening the valve 220' can cause the system 200' to be depressurized and permeate production to cease. The circulation and high pressure pumps 214', 216' can then be used to eject the concentrated brine and replace it with new feed, while some fluid continues to circulate through the circulation pump 218' and the recirculation conduit 206' until the brine is ejected from the system. It will be appreciated that, in some embodiments, both the circulation and high pressure pumps 214', 216' can be diaphragm pumps.

Some non-limiting examples of predetermined conditions to switch the system 200' to the flush phase can include a predetermined time, a predetermined concentration in the brine, a predetermined pressure, and the limitations of the pump, among others. For example, two robust ways of controlling the recovery ratio include monitoring the permeate flow-rate over time, e.g., the total permeate that is produced, and/or the brine concentration. When either of these quantities reach a predefined threshold, the system can be switched from the production phase to the flush phase. Accurate measurement of flow rate and concentration can be prohibitively expensive for this point-of-use application, so alternative methods to infer these quantities can be performed, for example, by a single pressure sensor, as described further below.

Figure 2B:
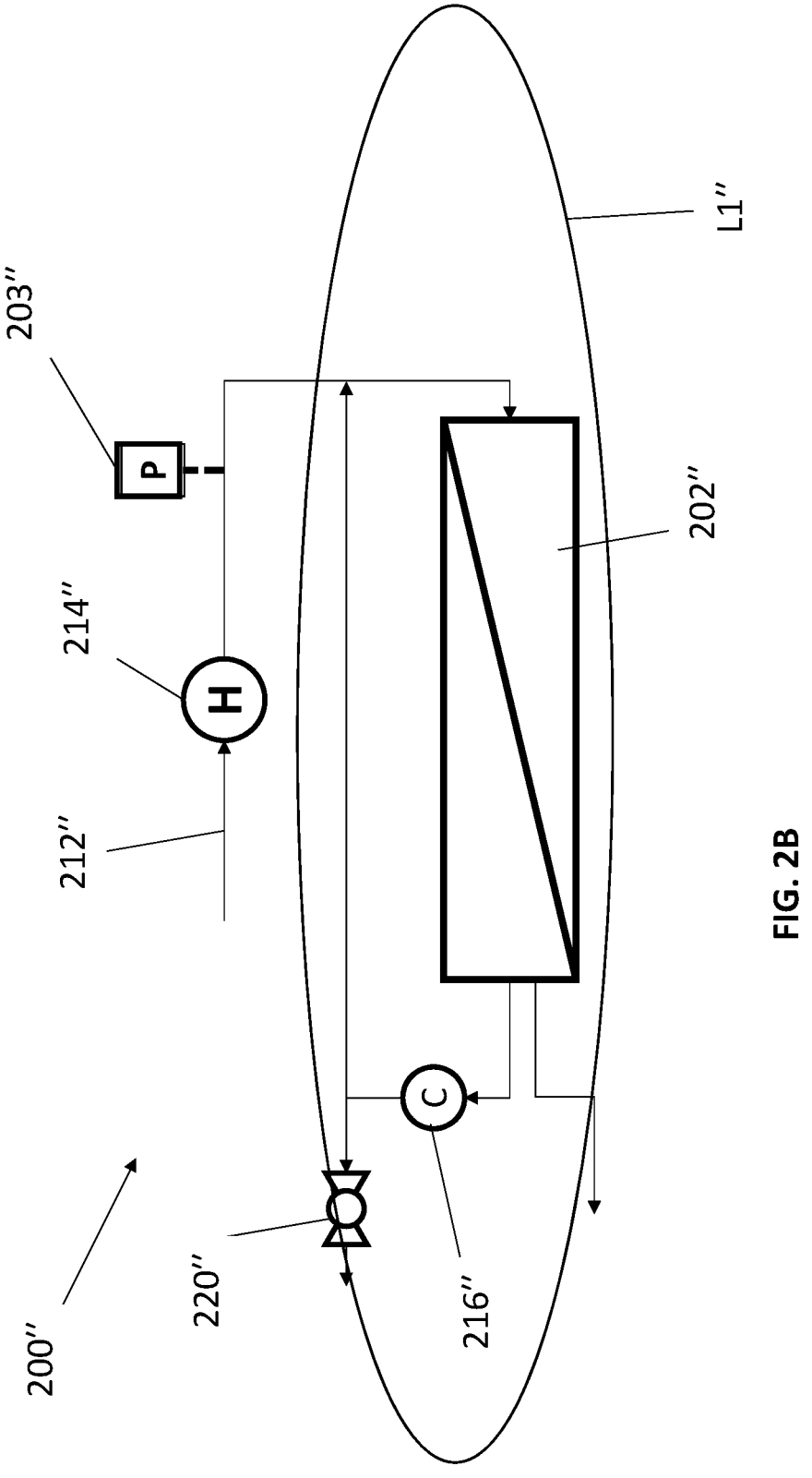
FIG. 2B illustrates a schematic diagram of another exemplary embodiment of a modified compact semi-batch RO system of the present disclosures.

FIG. 2B illustrates a system 200" having a pressure sensor 203" disposed along the inlet conduit 212" near the high pressure pump 214", though the pressure sensor 203" can be disposed anywhere along the circulation loop L1". Incorporation of the pressure sensor 203" can enable maximization of the production rate of the RO system 200". For example, the pressure sensor 203" can be used to take a pressure measurement that can be used to determine the permeate flow rate using a flow rate vs. pressure curve of the high pressure pump 214". This curve can be characteristic of the design of the pump and can depend, at least in part, on the voltage that is supplied to the pump. This voltage can be measured and/or determined as a function of the PWM signal. For example, if the PWM signal has a 50% duty cycle and modulates the output from a 12 V supply, then the pump is receiving approximately 6 V, as described further below. Alternatively. or additionally, using the high pressure pump curve, the PWM signal (or high pressure pump voltage measurement), pressure measurements, and/or semi-batch RO physics, the feed concentration to the system and/or membrane permeability can be estimated. These measurements can enable, for example: (i) control of the recovery ratio: (ii) collection of data on feed water quality wherever these units are deployed; and/or (iii) extrapolation of when the membrane will need replacement. This information, and/or conclusions derivable from this information (e.g., a notification that maintenance is required), can be relayed to maintenance providers, the owners, and/or others as appropriate. A person skilled in the art will recognize that use of the pressure sensor 203", as well as other sensors, such as flow or conductivity sensors, is optional in the system 200". Functionality of the system 200" therefore is not dependent on receiving feedback on the state of the system.

The system 200" can present an improvement over the functionality of the system 200' discussed above. For example, piping downstream from the solenoid valve 220" in the system 200" is minimized as compared to the system 200', which allows for increased compactness of the system 200". Additionally, placing the circulation pump 216" upstream of the solenoid valve 220", as shown in FIG. 2B, can result in superior flushing of the system 200" after each desalination cycle, and can minimize the fluid consumed during the flushing process. When the solenoid valve 220" is opened, the pressure of the circulation pump 216" can drive the brine at a faster flow rate out of the system through the solenoid valve 220", thereby minimizing the number of passes of the brine through the loop L1", allowing faster flushing and less water consumption.

Figure 3:
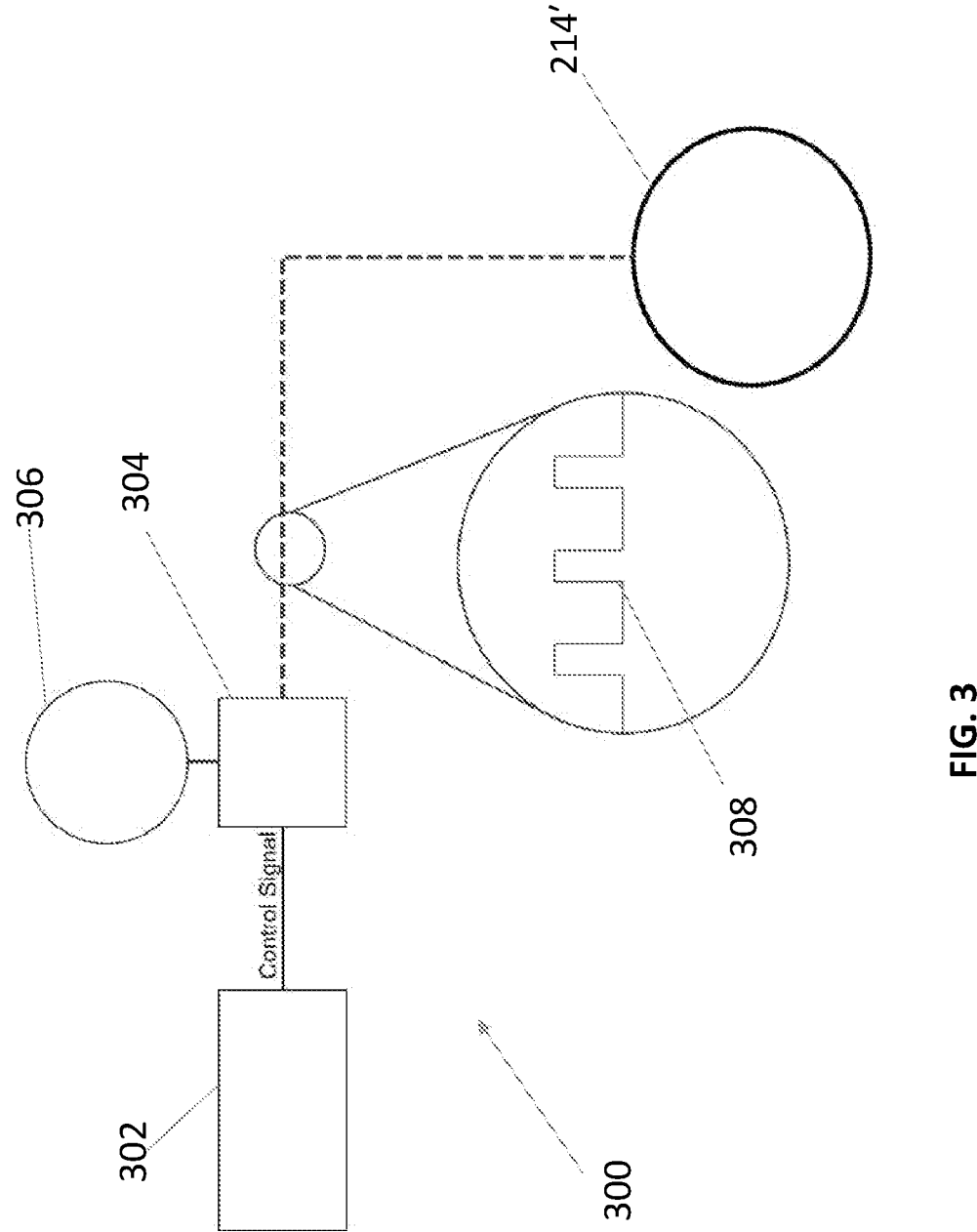
FIG. 3 is a schematic diagram of one exemplary embodiment of a control system that can control one or more pumps of the semi-batch RO system of FIG. 1.

The semi-batch RO system 200' can include a control system 300, sometimes referred to as a controller, and an example of which is shown in FIG. 3. The control system 300 can include a microcontroller 302 that can send a control signal to a switch 304. The control signal can be used to regulate a volumetric flow rate of the fluid with the pump. The microcontroller can be configured to output a pulse width modulation (PWM) signal 308 to the pump. The switch 304 can be connected to a power source 306, e.g., a direct current (DC) unit. It will be appreciated that the control system 300 can be connected to the high pressure pump 214, 214', as shown, though in some embodiments the control system 300 can connect to the circulation pump 216, 216' or another pump connected to the semi-batch RO systems 200 and 200'.

Conventional RO systems aim for high recovery ratios of permeate, e.g., 90% or more, but sacrifice footprint of the overall system. For example, for high recovery ratios, conventional systems can use up to six or eight RO elements set up in lengthier vessels, sometimes set-up in multiple stages, which significantly increases at least likelihood for failure and complexity, and correspondingly, a volume of the system such that tabletop applications are no longer viable. For example, to achieve a recovery rate of 90% or more using conventional RO systems, there may be multiple stages set-up. These conventional systems experience diminishing returns as the recovery of permeate approaches 100% due to the need for multiple RO elements, while the instantly disclosed system uses a single RO element to achieve substantially similar recovery ratios (as detailed above), thereby remaining viable for use in tabletop and other lab bench applications. The six or eight RO elements in the conventional systems can therefore create a larger flow rate than the flow rate experienced in the instant system, but the recovery remains substantially unchanged. It will be appreciated that in semi-batch RO systems, such as systems 200', 200", high recoveries are obtained by circulating the fluid through the RO element 202' repeatedly until salt precipitates, at which point the flushing phase can start.

The systems disclosed herein can utilize, by way of non-limiting example, membrane sizes of 1.5-1.8" Diameter×10-12" Length, that are rated for 10-150 Gallons per Day (GPD). In some embodiments, a 1.8"×12" RO element (1812) that is rated for 75 GPD of production can be used, such as FILMTEC 75 GPD REVERSE OSMOSIS MEMBRANES. A variety of different sized elements can be used, such as 2", 4", or 8" diameters, and they can be packed a variety of ways without departing from the spirit of the present disclosure. A semi-batch RO system achieves high recoveries more based on its set-up than the number of elements it uses. To that end, high recoveries can be obtained by circulating the brine through one or a few elements rather than using a single pass through more elements.

In some embodiments, the high pressure pump 214' can be connected and/or disconnected to the power source 306 in response to the PWM signal. The PWM signal can control the voltage applied to the pump. For example, when the PWM signal is at 100%, the full voltage of the power source 306 is being supplied, e.g., approximately 24 volts, while when the PWM signal is 50%, then approximately 12 volts can be supplied, and so forth. PWM can be used to modify existing pumps to control pump speed, and therefore a flow rate of the fluid through the system. Use of pulse modulation can provide granular control over a larger range of pump speeds that allow the pump to operate within a specifically defined range of pump speeds. For example, pulse modulation can be used in the system 200' to control the voltage sent to the motor of the pump, which in turn can control the pump flow rate and/or indirectly control pressure. It will be appreciated that the pump flow rate in point-of-use systems can be approximately in the range of about 5 Liters per hour to about 40 Liters per hour for high pressure pumps and approximately in the range of about 50 Liters per hour to about 200 Liters per hour for circulation pumps, with the flow rate varying depending, at least in part, on the capacity of the system being designed, the type of pump being used, the specifications of the motor, the voltage rating of the pump, etc. Pump flow rates can further vary, by way of non-limiting example, based on the size of the device. For instance, in large systems, maximum flow rates values for the high pressure pump permeate production can be approximately in the range of about 1000 Liters per hour to about 2000 Liters per hour for a circulation pump. By way of non-limiting example, in an instance in which a diaphragm pump is used for both the circulation pump and the high pressure pump, the flow rate can be about 100 Liters per hour. It will be appreciated that in at least some embodiments, PWM can be used to control the circulation pump 216' in lieu of, or in addition to, the high pressure pump 214'. Moreover, it will be appreciated that the high pressure pump 214' can be operated at lower flow rates, e.g., approximately less than about 30 Liters per hour to remain below the flux and pressure limitations of the RO element 202'.

The location of the circulation pump 216' relative to the solenoid valve 220' in combination with the use of pulse modulation to control pump speed allows for the system 200' to produce high recovery rates while maintaining compactness. For example, use of PWM can allow the present system 200' to maintain operating speeds at a maximum flow rate supported by the components of the system. For example, the microcontroller 302 can adjust the signal throughout operation of the system 200' to ensure that the system operates at a threshold tolerance of the most fragile component of the system. In some embodiments, such as in brackish water RO systems, the maximum flux that is supported through the RO element can thus become a limiting factor, or bottleneck, as flow through the entire system is capped at the maximum permeate flow rate or permeate production rate supported by the RO element, which is different than a circulation flow rate. In such embodiments, as salinity, or a build-up of any kinds of substances, such as fluids, sand, salt, grime, and so forth, of the RO element 202' accumulates, a feedback loop using one or more feedback sensors can indicate to the controller to tune the PWM settings to reduce the speed of the high pressure pump 214' to ensure operation at a peak pressure, e.g., approximately 140 psi for point of use applications, though in embodiments of larger systems, the pressure can be greater, such as approximately 300 psi, approximately 500 psi, approximately 1,000 psi, etc., and/or, more generally, a maximum flow rate supported by the RO element without risking rupture of the RO element.

Permeate production rate can be directly tied to pressure during operation. For example, controlling the PWM signal can control the rate of permeate production, or indirectly can control the pressure. In response, feedback can be used, for example, on the high pressure pump 214' to control for permeate production rate, which consequently can change the pressure, and/or control the pressure, which consequently can change the permeate production rate. A person skilled in the art will recognize that as a result of being tied to another, permeate production rate and pressure cannot typically be controlled separately in these embodiments, which differs from control of the recirculation of the flow rate of brine. Specifically, in brine flow, permeate production rate and pressure can be controlled independently at least because the permeate flow rate is set by the high pressure pump 214', while the recirculation flow rate is set by the circulation pump 216'. In some embodiments, the feedback sensor can provide frequent and/or continuous measurement of pressure, voltage, permeate flow rate, concentration, or current of fluid that enters or exits the RO element, and output these values to the controller. The controller can use these values to change the PWM signal used to control the pump to tune one or more system settings, e.g., pump flow rate, pressure, and so forth. It will be appreciated that in some embodiments the limiting factor of the RO element can be a pressure threshold tolerated therethrough.

There are numerous advantages to the semi-batch configuration provided for herein as compared to continuous configurations that are used in conventional point-of-use products. First, the semi-batch configuration as provided for herein can be flushed with new feed after each production phase. Because no portion of the RO element remains exposed to concentrated brine over long durations, the risk of scale formation is minimized in the disclosed semi-batch processes. In contrast, the tail end of an RO element in a continuous process is always exposed to the maximum brine concentration. As a result of point-of-use RO systems being able to be used intermittently in view of the present disclosures, membrane life will likely be extended due to reducing the membrane exposure to concentrated brine.

Second, RO elements are designed to operate with a minimum brine flow-rate and a maximum permeate flux. These two parameters together place an upper-bound on the maximum recovery that is feasible with one RO element in a continuous process. On the other hand, a semi-batch process offers independent control over the permeate flux and the brine flow rate.

The semi-batch process can be leveraged to estimate the feed concentration and membrane permeability using a time series of pressure data and the high-pressure pump curve. To illustrate the basic concept, the following simplifications can be made:

1. The per-pass recovery is low so that the brine concentration can be treated as spatially uniform within the circulation loop. The brine concentration is then treated as only changing temporally.
2. Concentration polarization can be neglected, or can be approximately modeled with a decreased membrane permeability coefficient.
3. The permeate is pure water.
4. The osmotic pressure is proportional to concentration.
5. Pressure drop through the feed-channel is negligible For example, at any time during the production phase of each batch cycle, the instantaneous permeate flow rate $Q_p$ is:

$$Q_p = A_{mem} S (P_f - \pi_b), \qquad (1) \text{ where}$$

$A_{mem}$ is the membrane water permeability coefficient, $P_f$ is pressure applied by the high-pressure pump, S is the total membrane area of the RO element, and $\pi_b$ is the instantaneous brine osmotic pressure, assuming that the concentration through the element is uniform.

Additionally, a mass balance during the production phase gives that:

$$V_s(C_b - C_f) = C_f \int_{t=0}^{\tau} Q_f dt, \qquad (2)$$

where Vs is the system hold-up volume, Cb is the instantaneous average brine concentration, Cf is the feed concentration, Qf is the feed flow rate, and t is the elapsed time. The left side of the equation represents the salt accumulation within the system and the right side is the inflow of salt into the system. The outflow of salt in the permeate stream is negligible. Note that during the production phase, the feed flow rate equals the permeate flow rate, so Qf=Qp, and if the osmotic pressure is proportional to concentration, then this equation can be written as:

$$V(\pi_b - \pi_f) = \pi_f V_p \qquad (3).$$

where $V_p$ is the accumulated permeate volume at time t:

$$V_p = \int_{t=0}^{\tau} Q_p dt. \qquad (4)$$

Rearranging the above gives:

$$\frac{\pi_b}{\pi_f} = 1 + \frac{V_p}{V_s} \qquad (5)$$

and combining the equations gives:

$$Q_p = A_{mem} S \left( P_f - \pi_f \left( 1 + \frac{V_p}{V_s} \right) \right). \qquad (6)$$

If the pressure Pf is measured, then the instantaneous permeate flow rate Qp can be inferred from a known, predefined, or previously characterized pump curve. Integration of $Q_p$ over time gives the accumulated permeate volume $V_p$. Therefore, $P_f$, $Q_p$, and $V_p$, are quantities that are measured in time. The system volume $V_s$ and the membrane area S are known quantities by design, e.g., quantities that can be set, for example, by piping diameter and lengths, RO element selection, and/or pump selection. Thus, the only two unknowns are the membrane permeability Amem and the feed osmotic pressure $\pi_f$. It follows that these two quantities can be estimated using the time series data of the measured quantities.

One way to perform such an estimate is to apply gradient descent. To do this, the equation above can be rewritten as:

$$[A] = x[B] - xy[C], \qquad (7)$$

where x=Amem and y=πf are unknown scalars. A, B, and C are vectors that are calculated from known quantities and the time series data of measured quantities, where:

$$A = \frac{Q_p}{S}, \qquad (8), (9)$$

$$B = P_f, \text{ and}$$

$$C = \left( 1 + \frac{V_p}{V_s} \right). \qquad (10)$$

Using this formulation, the values of x and y can be optimized, which can minimize the mean squared error (MSE) of the residual function E, where:

$$[E] = [A] - x[B] + xy[C], \text{ and} \qquad (11), (12)$$

$$MSE = \frac{1}{m} \sum_{i=1}^{m} E_i(x, y)^2.$$

Ei(x, y) is the ith of m elements of the vector [E] evaluated for a given combination of x and y values. Applying gradient descent, x and y can be optimized iteratively through:

$$\begin{bmatrix} x \\ y \end{bmatrix}^{new} = \qquad (13)$$

$$\begin{bmatrix} x \\ y \end{bmatrix}^{old} - \alpha \begin{bmatrix} \frac{\partial MSE}{\partial x} \\ \frac{\partial MSE}{\partial y} \end{bmatrix}^{old} = \begin{bmatrix} x \\ y \end{bmatrix}^{old} - \alpha \begin{bmatrix} \frac{2}{m} \sum E_i(x, y)(-B_i + yC_i) \\ \frac{2}{m} \sum E_i(x, y)(xC_i) \end{bmatrix}^{old},$$

where $\alpha$ is the learning rate that will have to be tuned for each semi-batch design. A person skilled in the art, in view of the present disclosures, will understand that tuning can be performed, for example, at least by one more of experimentation(s), simulation(s), and/or model(s). The above optimization can be performed on-board the systems provided for herein or otherwise derivable from the present disclosures, or in some instances more specifically a point-of-use RO purifier, in real-time as each batch is processed. This virtual sensor could be used to track variations in feed water processed by the purifier, and monitor membrane life, without the need for additional physical sensors. One or more virtual sensors as provided for herein can be incorporated into any of the RO systems or methods provided for herein or otherwise derivable from the present disclosures. Likewise, one or more such sensors can be incorporated into other systems and methods where appropriate without departing from the spirit of the present disclosure.

Figure 4:
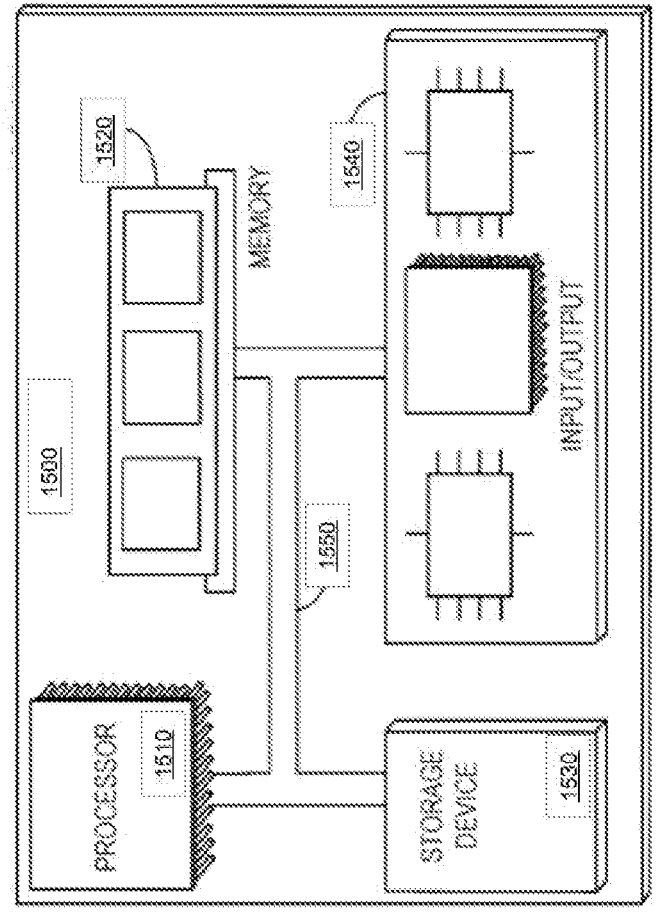
FIG. 4 is a schematic diagram of one exemplary embodiment of a computer system upon which the control system of the present disclosures is built.

As noted above, in some embodiments, the system 200' can be coupled and/or otherwise associated with a controller configured to move the first and second fluid paths between a permeate-generating configuration and a flushing configuration, such configurations being understood in view of the present disclosures. FIG. 4 is a block diagram of one exemplary embodiment of a computer system 1500 upon which the controller or control system of the present disclosures can be built, performed, trained, etc. For example, any modules or systems can be examples of the system 1500 described herein. The system 1500 can include a processor 1510, a memory 1520, a storage device 1530, and an input/output device 1540. Each of the components 1510, 1520, 1530, and 1540 can be interconnected, for example, using a system bus 1550. The processor 1510 can be capable of processing instructions for execution within the system 1500. The processor 1510 can be a single-threaded processor, a multi-threaded processor, or similar device. The processor 1510 can be capable of processing instructions stored in the memory 1520 or on the storage device 1530. The processor 1510 may execute operations such as, by way of non-limiting examples, starting and stopping flow of fluid, control of fluid paths or pressures, and system configurations that can be automatic, in response to various parameters, and/or manually controlled by a user, including in response to signals, parameters, and so forth, and/or based on observation/preference, and so forth, among other features described in conjunction with the present disclosure. The controller 1500 can optimize operation in response to varying feedwater conditions, varying water demand, varying power pricing, and other factors that can relate to the energy efficiency, reliability, maintenance, or levelized cost of freshwater. In some instances, the controller 1500 can optimize operation in response to stored and/or desired flush times, permeate salinity, and/or operating pressures. The controller 1500 may further embed machine-learning techniques, artificial intelligence, and/or digital twinning that can aid in improving performance.

The memory 1520 can store information within the system 1500. In some implementations, the memory 1520 can be a computer-readable medium. The memory 1520 can, for example, be a volatile memory unit or a non-volatile memory unit. In some implementations, the memory 1520 can store information related to fluid paths and system components, such as when and/or in response to what conditions the permeate-generating configuration and the flushing configuration should be implemented and/or different configurations for the various loops permitted by the system, storing the flush times, permeate salinity, and/or operating pressures, among other information, which can allow for a machine learning optimization of the system.

The storage device 1530 can be capable of providing mass storage for the system 1500. In some implementations, the storage device 1530 can be a non-transitory computer-readable medium. The storage device 1530 can include, for example, a hard disk device, an optical disk device, a solid-date drive, a flash drive, magnetic tape, and/or some other large capacity storage device. The storage device 1530 may alternatively be a cloud storage device, e.g., a logical storage device including multiple physical storage devices distributed on a network and accessed using a network. In some implementations, the information stored on the memory 1520 can also or instead be stored on the storage device 1530.

The input/output device 1540 can provide input/output operations for the system 1500. In some implementations, the input/output device 1540 can include one or more of network interface devices (e.g., an Ethernet card or an InfiniBand interconnect), a serial communication device (e.g., an RS-232 10 port), and/or a wireless interface device (e.g., a short-range wireless communication device, an 802.7 card, a 3G wireless modem, a 4G wireless modem, a 5G wireless modem). In some implementations, the input/output device 1540 can include driver devices configured to receive input data and send output data to other input/output devices, e.g., a keyboard, a printer, and/or display devices. In some implementations, mobile computing devices, mobile communication devices, and other devices can be used.

In some implementations, the system 1500 can be a microcontroller. A microcontroller is a device that contains multiple elements of a computer system in a single electronics package. For example, the single electronics package could contain the processor 1510, the memory 1520, the storage device 1530, and/or input/output devices 1540.

Although an example processing system has been described above, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier, for example a computer-readable medium, for execution by, or to control the operation of, a fluid filtration system. The computer readable medium can be a machine-readable storage device, a machine-readable storage substrate, a memory device, a composition of matter effecting a machine-readable propagated signal, or a combination of one or more of them.

Various embodiments of the present disclosure may be implemented at least in part in any conventional computer programming language. For example, some embodiments may be implemented in a procedural programming language (e.g., "C" or ForTran95), in an object-oriented programming language (e.g., "C++"), and/or other programming languages (e.g. Java, Javascript, PHP, Python, and/or SQL). Other embodiments may be implemented as a pre-configured, stand-along hardware element and/or as preprogrammed hardware elements (e.g., application specific integrated circuits, FPGAs, and digital signal processors), or other related components.

The term "computer system" may encompass all apparatus, devices, and machines for processing data, including, by way of non-limiting examples, a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Such implementation may include a series of computer instructions fixed either on a tangible, non-transitory medium, such as a computer readable medium. The series of computer instructions can embody all or part of the functionality previously described herein with respect to the system. Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. The components of the system can be interconnected by any form or medium of digital data communication, e.g., a communication network. Examples of communication networks include a local area network ("LAN") and a wide area network ("WAN"), e.g., the Internet.

Those skilled in the art should appreciate that such computer instructions can be written in a number of programming languages for use with many computer architectures or operating systems. Furthermore, such instructions may be stored in any memory device, such as semiconductor, magnetic, optical, or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the present disclosure may be implemented as a combination of both software (e.g., a computer program product) and hardware. Still other embodiments of the present disclosure are implemented as entirely hardware, or entirely software.

Examples of the above-described embodiments can include the following:

1. A fluid desalination system, comprising:

at least one reverse osmosis element having an inlet and an outlet;

a conduit network that comprises a loop and a permeate branch, the loop being in fluid communication with the at least one reverse osmosis element to convey fluid passed through the at least one reverse osmosis element from the outlet to the inlet so the fluid enters the at least one reverse osmosis element again, and the permeate branch being in fluid communication with the at least one reverse osmosis element to receive fluid that has been desalinated by the at least one reverse osmosis element;

a first pump disposed within the loop and configured to move the fluid from the outlet and towards the inlet;

a second pump configured to introduce fluid into at least one of the loop and the at least one reverse osmosis element; and a controller configured to supply a pulse width modulation signal to the second pump to control at least one of a pressure, a flow speed, or a volumetric flow rate of the fluid introduced by the second pump into at least one of the loop and the at least one reverse osmosis element.

2. The system of example 1, wherein the at least one reverse osmosis element comprises no more than two reverse osmosis elements.

3. The system of example 2, wherein the at least one reverse osmosis element comprises two reverse osmosis elements, the two reverse osmosis elements being arranged in series.

4. The system of example 2 or example 3, wherein the at least one reverse osmosis element comprises two reverse osmosis elements, the two reverse osmosis elements being arranged in parallel.

5. The system of any of examples 1 to 4, wherein a flow rate of the fluid through the second pump is approximately in the range of about 5 Liters per hour to about 40 Liters per hour.

6. The system of any of examples 1 to 5, wherein the first pump comprises a diaphragm pump having one or more check valves disposed therein.

7. The system of any of examples 1 to 6, wherein the loop is devoid of a one-way valve that is separately disposed from the first pump.

8. The system of any of examples 1 to 7, wherein the controller is configured to adjust the pulse width modulation signal based on an accumulation of salinity in the at least one reverse osmosis element.

9. The system of any of examples 1 to 7, further comprising:

one or more feedback sensors configured to measure at least one of pressure, voltage, permeate flow rate, concentration, or current of fluid entering or leaving the at least one reverse osmosis element and deliver the measurements as an output to the controller, wherein the controller is configured to adjust the pulse width modulation signal based on the output of the one or more feedback sensors.

10. The system of any of examples 1 to 8, wherein the conduit network further comprises a waste branch, the waste branch having a valve configured to be toggled to allow fluid to drain from at least one of the loop and the at least one reverse osmosis element.

11. A method of operating a desalination system, comprising:

flowing a fluid through a conduit network through at least one reverse osmosis element, the conduit network having at least a loop and a permeate branch; and recirculating a fluid that exits the at least one reverse osmosis element through the loop and back into the at least one reverse osmosis element, the fluid flowing through a pump that is disposed within the loop, wherein a flow rate through the pump is approximately in the range of about 50 Liters per hour to about 200 Liters per hour.

12. The method of example 11, wherein the pump includes one or more check valves disposed therein.

13. The method of example 11 or example 12, wherein flowing the fluid further comprises operating a second pump to generate a pressure across the conduit network to flow the fluid into at least one of the loop and the at least one reverse osmosis element.

14. The method of example 13, further comprising sending a signal to the second pump to adjust one or more of a pressure, a flow speed, or a volumetric flow rate of the fluid output by the second pump.

15. The method of example 14, wherein the signal is a pulse width modulation signal.

16. The method of example 14 or example 15, further comprising adjusting the signal based on an amount of an accumulation of salinity in the at least one reverse osmosis element.

17. The method of any of examples 14 to 16, further comprising:

measuring at least one of pressure, voltage, permeate flow rate, or current of the system;

determining a concentration of fluid based on the measurement of the at least one of pressure, voltage or current of the system; and adjusting the signal based on the determined concentration of the fluid.

18. The method of any of examples 11 to 17, wherein the at least one reverse osmosis element comprises no more than two membranes.

19. The method of any of examples 11 to 18, wherein the loop is devoid of a one-way valve that is separately disposed from the pump.

20. A fluid desalination system, comprising:

at least one reverse osmosis element having an inlet and an outlet;

a conduit network that comprises a loop and a permeate branch, the loop being in fluid communication with the at least one reverse osmosis element to convey fluid passed through the at least one reverse osmosis element from the outlet to the inlet so the fluid enters the at least one reverse osmosis element again, and the permeate branch being in fluid communication with the at least one reverse osmosis element to receive fluid that has been desalinated by the at least one reverse osmosis element; and a pump disposed within the loop and configured to move the fluid from the outlet and towards the inlet, the pump having one or more one-way check valves disposed therein, wherein the loop is devoid of a one-way valve that is separately disposed from the pump.

21. The system of example 20, further comprising a second pump configured to introduce fluid into at least one of the loop and the at least one reverse osmosis element.

22. The system of example 21, further comprising a control system configured to supply a pulse width modulation signal to the second pump to control at least one of a flow speed or a volumetric flow rate of the fluid introduced by the second pump into at least one of the loop and the at least one reverse osmosis element.

23. The system of any of examples 20 to 22, wherein the at least one reverse osmosis element comprises no more than two membranes.

24. The system of example 23, wherein the at least one reverse osmosis element comprises two reverse osmosis elements, the two reverse osmosis elements being arranged in series.

25. The system of example 23 or example 24, wherein the at least one reverse osmosis element comprises two reverse osmosis elements, the two reverse osmosis elements being arranged in parallel.

26. The system of any of examples 20 to 25, wherein the conduit network further comprises a waste branch, the waste branch having a valve configured to be toggled to allow fluid to drain from at least one of the loop and the at least one reverse osmosis element.

One skilled in the art will appreciate further features and advantages of the disclosures based on the provided for descriptions and embodiments. Accordingly, the embodiments are not to be limited by what has been particularly shown and described. All publications and references cited herein are expressly incorporated herein by reference in their entirety.

What is claimed is:

1. A fluid desalination system, comprising:

at least one reverse osmosis element having an inlet and an outlet;

a conduit network that comprises a loop and a permeate branch, the loop being in fluid communication with the at least one reverse osmosis element to convey fluid passed through the at least one reverse osmosis element from the respective outlets of each of the at least one reverse osmosis elements to the respective inlets of each of the at least one reverse osmosis elements so the fluid enters at least one of the at least one reverse osmosis elements again, and the permeate branch being in fluid communication with the at least one reverse osmosis element to receive fluid that has been desalinated by the at least one reverse osmosis element;

a first pump disposed within the loop and configured to move the fluid from the respective outlets of each of the at least one reverse osmosis elements and towards the respective inlets of each of the at least one reverse osmosis elements;

a second pump configured to introduce fluid into at least one of the loop and the at least one reverse osmosis element; and a controller configured to supply a pulse width modulation signal to the second pump to control at least one of a pressure, a flow speed, or a volumetric flow rate of the fluid introduced by the second pump into at least one of the loop and the at least one reverse osmosis element, wherein the controller is configured to control the second pump based on accumulation of salinity in the at least one reverse osmosis element.

2. The system of claim 1, wherein the at least one reverse osmosis element comprises no more than two reverse osmosis elements.

3. The system of claim 2, wherein the at least one reverse osmosis element comprises two reverse osmosis elements, the two reverse osmosis elements being arranged in series.

4. The system of claim 2, wherein the at least one reverse osmosis element comprises two reverse osmosis elements, the two reverse osmosis elements being arranged in parallel.

5. The system of claim 1, wherein a flow rate of the fluid through the second pump is in the range of liters per hour to 40 liters per hour.

6. The system of claim 1, wherein the loop is devoid of a one-way valve that is separately disposed from the first pump.

7. The system of claim 1, further comprising:

one or more feedback sensors configured to measure a value of at least one of pressure, voltage, permeate flow rate, concentration, or current of fluid entering or leaving the at least one reverse osmosis element and deliver the value as an output to the controller,

wherein the controller is configured to adjust the pulse width modulation signal based on the output of the one or more feedback sensors.

8. A method of operating a desalination system, comprising:
flowing a fluid through a conduit network through at least one reverse osmosis element, the conduit network having at least a loop and a permeate branch;
recirculating a fluid that exits the at least one reverse osmosis element through the loop and back into the at least one reverse osmosis element, the fluid flowing through a pump that is disposed within the loop;
sending a signal to a second pump to adjust one or more of a pressure, a flow speed, or a volumetric flow rate of the fluid that is output by the second pump, and
adjusting the signal based on an amount of accumulation of salinity in the at least one reverse osmosis element,
wherein a flow rate through the pump is in the range of 50 liters per hour to 200 liters per hour.

9. The method of claim 8, wherein the signal is a pulse width modulation signal.

10. The method of claim 8, further comprising:
measuring a value of at least one of pressure, voltage, permeate flow rate, or current of the system;
determining a concentration of fluid based on the value of the at least one of pressure, voltage or current of the system; and
adjusting the signal based on the concentration of the fluid that is determined.

11. The method of claim 8, wherein the at least one reverse osmosis element comprises no more than two reverse osmosis elements.

12. The method of claim 8, wherein the loop is devoid of a one-way valve that is separately disposed from the pump.

13. A fluid desalination system, comprising:
at least one reverse osmosis element having an inlet and an outlet;
a conduit network that comprises a loop and a permeate branch, the loop being in fluid communication with the at least one reverse osmosis element to convey fluid passed through the at least one reverse osmosis element from the respective outlets of each of the at least one reverse osmosis elements to the respective inlets of each of the at least one reverse osmosis elements so the fluid enters at least one of the at least one reverse osmosis elements again, and the permeate branch being in fluid communication with the at least one reverse osmosis element to receive fluid that has been desalinated by the at least one reverse osmosis element; and
a first pump disposed within the loop and configured to move the fluid from the respective outlets of each of the at least one reverse osmosis elements and towards the respective inlets of each of the at least one reverse osmosis elements the first pump having one or more one-way check valves disposed therein;
a second pump configured to introduce fluid into at least one of the loop and the at least one reverse osmosis element;
a control system configured to supply a pulse width modulation signal to the second pump to control at least one of a flow speed or a volumetric flow rate of the fluid introduced by the second pump into at least one of the loop and the at least one reverse osmosis element,
wherein the loop is devoid of a one-way valve that is separately disposed from the first pump, and wherein the controller is configured to control the second pump based on accumulation of salinity in the at least one reverse osmosis element.

14. The system of claim 13, wherein the at least one reverse osmosis element comprises no more than two reverse osmosis elements.

15. The system of claim 14, wherein the at least one reverse osmosis element comprises two reverse osmosis elements, the two reverse osmosis elements being arranged in series.

* * * * *